United States Patent
Suchao-In et al.

(10) Patent No.: US 10,865,296 B2
(45) Date of Patent: Dec. 15, 2020

(54) BIMODAL POLYETHYLENE COMPOSITION AND PIPE COMPRISING THE SAME

(71) Applicants: Thai Polyethylene Co., Ltd., Bangkok (TH); SCG Chemicals Co., Ltd., Bangkok (TH)

(72) Inventors: Natthaporn Suchao-In, Bangkok (TH); Warachad Klomkamol, Bangkok (TH); Patcharin Samphawamontri, Bangkok (TH)

(73) Assignees: Thai Polyethylene Co., Ltd., Bangkok (TH); SCG Chemicals Co., Ltd., Bangkok (TH)

( * ) Notice: Subject to any disclaimer, the term of this patent is extended or adjusted under 35 U.S.C. 154(b) by 14 days.

(21) Appl. No.: 16/332,093

(22) PCT Filed: Sep. 8, 2017

(86) PCT No.: PCT/EP2017/072595
§ 371 (c)(1),
(2) Date: Mar. 11, 2019

(87) PCT Pub. No.: WO2018/046668
PCT Pub. Date: Mar. 15, 2018

(65) Prior Publication Data
US 2019/0359802 A1    Nov. 28, 2019

(30) Foreign Application Priority Data

Sep. 12, 2016   (EP) .................... 16188326

(51) Int. Cl.
| | | |
|---|---|---|
| C08L 23/06 | (2006.01) | |
| C08F 110/02 | (2006.01) | |
| C08F 210/14 | (2006.01) | |
| C08F 210/16 | (2006.01) | |
| C08L 23/08 | (2006.01) | |

(52) U.S. Cl.
CPC ............ C08L 23/06 (2013.01); C08F 110/02 (2013.01); C08F 210/14 (2013.01); C08F 210/16 (2013.01); C08L 23/0815 (2013.01); C08L 2203/18 (2013.01); C08L 2205/025 (2013.01)

(58) Field of Classification Search
CPC .... C08F 210/16; C08F 210/14; C08F 110/02; C08F 2500/05; C08F 2500/02; C08F 2/001; C08F 2500/01; C08F 2500/17; C08L 23/0815; C08L 23/06; C08L 2205/025; C08L 2308/00; C08L 2207/068; C08L 2203/18
See application file for complete search history.

(56) References Cited

U.S. PATENT DOCUMENTS

| | | |
|---|---|---|
| 6,291,601 B1 | 9/2001 | Debras |
| 6,713,561 B1 | 3/2004 | Berthold et al. |
| 6,716,936 B1 | 4/2004 | McGrath et al. |
| 8,759,448 B2 | 6/2014 | Buryak et al. |
| 8,802,768 B2 | 8/2014 | Dotsch et al. |
| 2003/0191251 A1 | 10/2003 | McGrath |
| 2004/0204542 A1 | 10/2004 | Mattioli et al. |
| 2006/0074194 A1 | 4/2006 | Berthold et al. |
| 2006/0154011 A1* | 7/2006 | Bettonville et al. .... C08L 23/04 428/36.91 |
| 2009/0105422 A1 | 4/2009 | Berthold et al. |
| 2009/0163679 A1 | 6/2009 | Do Nascimento et al. |
| 2009/0304966 A1 | 12/2009 | Mehta et al. |
| 2010/0010163 A1 | 1/2010 | Berthold et al. |
| 2010/0016526 A1 | 1/2010 | Etherton et al. |
| 2010/0035008 A1 | 2/2010 | Backman |
| 2010/0092709 A1 | 4/2010 | Joseph |
| 2010/0152383 A1 | 6/2010 | Jiang et al. |
| 2010/0301054 A1 | 12/2010 | Berthold et al. |
| 2014/0030460 A1 | 1/2014 | Monoi et al. |
| 2015/0051364 A1 | 2/2015 | Vahteri et al. |

FOREIGN PATENT DOCUMENTS

| | | |
|---|---|---|
| EP | 1041113 A1 | 10/2000 |
| EP | 1201713 A1 | 5/2002 |
| EP | 1460105 A1 | 9/2004 |
| EP | 1417260 B1 | 8/2005 |
| EP | 1578862 B1 | 9/2005 |
| EP | 1655334 A1 | 5/2006 |
| EP | 1576047 B1 | 7/2006 |
| EP | 1576049 B1 | 7/2006 |
| EP | 2017302 A1 | 1/2009 |
| EP | 2130863 A1 | 12/2009 |
| EP | 2354184 A1 | 8/2011 |
| EP | 2407506 A1 | 1/2012 |
| EP | 2365995 B1 | 12/2012 |
| EP | 2743305 A1 | 6/2014 |
| EP | 2668231 B1 | 10/2014 |

(Continued)

OTHER PUBLICATIONS

Oct. 23, 2017—ISR and WO PCT/EP2017/072595.

*Primary Examiner* — Nathan M Nutter
(74) *Attorney, Agent, or Firm* — Banner & Witcoff, Ltd.

(57) ABSTRACT

The present invention relates to a bimodal polyethylene composition comprising a low molecular weight polyethylene homopolymer fraction and high molecular weight polyethylene copolymer fraction having a $C_4$ to $C_{10}$ α-olefin comonomer content of 0.25 to 3% mol with respect to the total monomer comprised in the high molecular weight polyethylene comonomer fraction, wherein the content of the low molecular weight polyethylene is from 50 to 60 wt % with respect to the total weight of the bimodal polyethylene composition; and the bimodal polyethylene composition has a soluble fraction according to Temperature Rising Elution Fractionation in 1,2,4-trichlorobenzene with 300 ppm of butylated hydroxytoluene at 150° C. of less than 6 wt %; and a pipe comprising the same.

16 Claims, No Drawings

(56) References Cited

FOREIGN PATENT DOCUMENTS

| | | | |
|---|---|---|---|
| EP | 2907843 | A1 | 8/2015 |
| HU | 0800771 | A2 | 10/2010 |
| JP | 2012-067914 | A | 4/2012 |
| WO | 9618677 | A1 | 6/1996 |
| WO | 2004056921 | A1 | 7/2004 |
| WO | 2006/092377 | A1 | 9/2006 |
| WO | 2006092378 | A1 | 9/2006 |
| WO | 2006092379 | A1 | 9/2006 |
| WO | 2007003530 | A1 | 1/2007 |
| WO | 2007042216 | A1 | 4/2007 |
| WO | 2007045415 | A1 | 4/2007 |
| WO | 2008006487 | A1 | 1/2008 |
| WO | 2008049551 | A1 | 5/2008 |
| WO | 2008131817 | A1 | 11/2008 |
| WO | 2009003627 | A1 | 1/2009 |
| WO | 2009077142 | A1 | 6/2009 |
| WO | 2009147022 | A1 | 12/2009 |
| WO | 2010025342 | A2 | 3/2010 |
| WO | 2012069400 | A1 | 5/2012 |
| WO | 2013101767 | A2 | 7/2013 |
| WO | 2013113797 | A1 | 8/2013 |
| WO | 2013144324 | A1 | 10/2013 |
| WO | 2013144328 | A1 | 10/2013 |
| WO | 2014091501 | A1 | 6/2014 |
| WO | 2015121161 | A1 | 8/2015 |

\* cited by examiner

BIMODAL POLYETHYLENE COMPOSITION AND PIPE COMPRISING THE SAME

CROSS-REFERENCE TO RELATED APPLICATIONS

This application is a U.S. National Stage application under 35 U.S.C. § 371 of International Application PCT/EP2017/072595 (published as WO 2018/046668 A8), filed Sep. 8, 2017, which claims the benefit of priority to Application EP 16188326.9, filed Sep. 12, 2016. Benefit of the filing date of each of these prior applications is hereby claimed. Each of these prior applications is hereby incorporated by reference in its entirety.

The present invention relates to a bimodal polyethylene composition and a pipe comprising the same.

A variety of polyethylene pipes is well-known in the art. Polyethylene pipes are wide spread for industrial applications, such as gas and liquid supply. Although a lot of different polyethylene compositions are known in the art, there is still a need to provide new polyethylene compositions which may be used for preparing pipes and which are helpful to improve the properties thereof.

After the launch of PE100, the material has been improved and further developed with respect to other properties related to the production of larger dimensions and higher wall thickness. Because of the high wall thickness the producers had problems with sagging of material in the extrusion process. Low sag grades of PE100 were then developed.

Few years ago, the PE100 material got new requirements focusing on the pipes properties with respect to crack propagation because of the harsh handling during the pulling process of the pipe through the ground. It is high stress crack resistant (RC) material which inhibits the progress of the crack by decreasing the density. This means that any notches developed during installation are much less likely to initiate cracks and that the growth rate of any cracks that do occur will be dramatically reduced. The main distinction is the excellent in slow crack growth (SCG) resistance property up to more than 1 year comparing with $3^{rd}$ generation PE100 for only 500 h.

US 2010/0092709 A1 discloses a multimodal polyethylene resin useful for manufacturing of thick walled pipe which is produced in a process wherein the second stage of the process is a copolymerization conducted at a high temperature with a low comonomer to ethylene ratio and a low hydrogen to ethylene ratio.

US 2010/0035008 A1 is related to a pipe or supplementary pipe article comprising a polyethylene composition which is formed by a first ethylene homo- or copolymer fraction and a second ethylene homo- or copolymer fraction, wherein the first fraction has a lower average molecular weight then the second fraction.

US 2009/0304966 A1 discloses a bimodal polyethylene resin suitable for use in pipe resin applications which is produced in a two-reactor cascade slurry polymerization process using a Ziegler-Natta catalyst system in the presence of an alkoxysilane modifier.

WO 2008/006487 A1 refers to a polyethylene composition having a density of at least 0.946 g/cm$^3$ and a melt flow index $MI_5$ of 0.05 to 2 g/10 min comprising two different polyethylene fractions.

WO 2013/101767 A2 is related to a bimodal high-density polyethylene polymer composition having a density of about 0.945 g/cm$^3$, comprising two different polyethylene polymers with different density.

EP 1 041 113 A1 is related to a high density multimodal polyethylene composition comprising at least 20% by weight of a high molecular weight fraction having a density of 0.930 g/cm$^3$ or less and a high load melt index of 0.40 g/10 min or less.

Although numerous pipe compositions are known and used, there is still a need for improved durable materials, especially for transmission and distribution pipe service for gases and water. It is desired that the materials should exhibit improved durability and/or long term resistance.

With respect to the polymer properties, the higher the density of the polyethylene, the higher will be the long term hydrostatic strength. In order to improve the stress cracking resistance of a polyethylene pipes, the increasing of molecular weight or decreasing density of the polymer should be focused. When the density is decreased, the rigidity of the polyethylene is unfavorably deteriorated.

In other words, it is the object of the present invention to provide bimodal polyethylene compositions overcoming drawbacks of the prior art, in particular compositions which may be used for manufacturing pipes and which are suitable to improve pressure resistance and slow crack growths (SCG) thereof.

This object is achieved by a bimodal polyethylene composition comprising a low molecular weight polyethylene homopolymer fraction and a high molecular weight polyethylene copolymer fraction having a $C_4$ to $C_{10}$ α-olefin comonomer content of 0.25 to 3% mol with respect to the total monomer comprised in the high molecular weight polyethylene comonomer fraction, wherein the content of the low molecular weight polyethylene is from 50-60 wt % with respect to the total weight of the bimodal polyethylene composition; and the bimodal polyethylene composition has a soluble fraction according to Temperature Rising Elution Fractionation, TREF, in 1,2,4-trichlorobenzene with 300 ppm of butylated hydroxytoluene at 150° C. of less than 6% wt.

The term "butylated hydroxytoluene" refers to 2,6-di-tert-butyl-4-methylphenol.

In particular, it is the finding of present invention that by selecting a particular polymer design it is possible to obtain resins having excellent stress crack resistance with other properties conform to PE112RC.

A bimodal polymer in this regard is a polymeric material which, in principle, consists of two intimately mixed polymers (i.e. a first polymer fraction mixed with a second polymer fraction) having a different molecular weight, in particular having a different weight average molecular weight.

The term low molecular weight polyethylene refers to polyethylene, preferably a polyethylene homopolymer, having a weight average molecular weight (Mw) from 25,000 to 80,000 g/mol. The term high molecular weight polyethylene refers to a polyethylene (or polyethylene copolymer) having a weight average molecular weight from 130,000 to 1,200,000 g/mol.

A homopolymer is a polymer merely consisting of one type of monomer units. Likewise, a copolymer is a polymer which is formed from more than one comonomer units. The inventive polyethylene copolymer is formed by mixing ethylene monomers with 0.25 to 3 mol % of another α-olefin.

The weight average molecular weight of the bimodal polyethylene composition (or the respective constituents thereof) is determined using gel permeation chromatography (GPC). For this purpose, around 8 mg of sample were dissolved in 80 ml of 1, 2, 4-trichlorobenzene at 160° C. for 90 min. Then, the sample solution, 200 μl, was injected into a high temperature GPC with IR5, an infrared detector (Polymer Char, Spain) with a flow rate of 0.5 ml/min at 145° C. in column zone and 160° C. in detector zone. The data achieved this way were processed by GPC One® Software Polymer Char Spain.

In a preferred embodiment, the bimodal polyethylene composition has a density from 0.945 to 0.965 g/cm$^3$, more preferably from 0.952 to 0.965 g/cm$^3$ and most preferably from 0.955 to 0.963 g/cm$^3$, and a MI$_5$ of 0.10 to 0.50 g/10 min, more preferably from 0.15 to 0.35 g/cm$^3$ and most preferably from 0.18 to 0.28 g/cm$^3$.

The density of the polyethylene composition (or the constituents thereof) was measured by observing the level to which a pellet sinks in a liquid column gradient tube, in comparison with a standard of known density. This method is determination of the solid plastic after annealing at 120° C. following ISO 1183.

The melt flow index (MI$_5$) was determined according to ISO 1133 and is indicated in g/10 min and describes the flowability of a polymer under testing conditions at 190° C. with a load of 5 kg.

It may be further preferred that the bimodal polyethylene composition comprises 50 to 60% wt with respect to the total weight of the bimodal polyethylene composition of the low molecular weight polyethylene homopolymer fraction and 40 to 50% wt with respect to the total weight of the bimodal polyethylene composition of the high molecular weight polyethylene copolymer fraction.

In a preferred embodiment, the bimodal polyethylene composition has the soluble fraction according to Temperature Rising Elution Fractionation in 1,2,4-trichlorobenzene with 300 ppm of butylated hydroxytoluene at 150° C. of 2 to 5.9% wt.

Preferably, the bimodal polyethylene composition has the soluble fraction according to Temperature Rising Elution Fractionation in 1,2,4-trichlorobenzene with 300 ppm of butylated hydroxytoluene at 150° C. of 3 to 5.9% wt.

More preferred, the high molecular weight polyethylene copolymer fraction having a C$_4$ to C$_{10}$ α-olefin comonomer content of 0.25 to 2% mol with respect to the total monomer comprised in the high molecular weight polyethylene comonomer fraction.

It is preferred that the high molecular weight polyethylene copolymer fraction having a C$_4$ to C$_{10}$ α-olefin comonomer content of 0.5 to 1% mol with respect to the total monomer comprised in the high molecular weight polyethylene comonomer fraction.

It is also preferred that the low molecular weight polyethylene is from 50 to 55% wt with respect to the total weight of the bimodal polyethylene composition.

Moreover, it is preferred that the high molecular weight polyethylene is from 45 to 50% wt with respect to the total weight of the bimodal polyethylene composition.

It is further preferred that the C$_4$ to C$_{10}$ α-olefin comonomer is selected from 1-butene, 1-hexene, 1-octene, 1-decene or mixtures thereof, preferably 1-hexene.

Finally, the object is achieved by a pipe comprising the inventive bimodal polyethylene composition.

In this regard it is preferred that the pipe is substantially comprising the bimodal polyethylene composition, which means that the pipe does, besides the inventive bimodal polyethylene composition, merely comprises constituents of the type and in the amount not significantly affecting the properties of the pipe, in particular with respect to pressure resistance and slow crack growths. It is particularly preferred that the inventive pipe consists of the bimodal polyethylene composition.

In preferred embodiments of the invention, namely with respect to the inventive bimodal polyethylene composition as well as with respect to the inventive pipe prepared therefrom, "comprising" is "consisting of".

The above embodiments mentioned to be preferred result in even more improved properties with respect to high pressure resistance and in more improved slow crack growths.

In terms of the invention, a pipe is a tubular section or hollow cylinder, usually but not necessarily of circular cross-section, used mainly to convey substances which can flow—liquids and gases (fluids), slurries, powders and masses of small solids—from one place to another place.

It was surprisingly found by the inventors that the inventive bimodal polyethylene composition allows to prepare pipes having improved mechanical properties.

The low molecular weight (LMW) polyethylene monopolymer used in the invention composition has a specific soluble fraction in TREF measurement during polymerization which is one of the key factors to control the balance of pressure resistance and SCG. The separation of the LMW polymer is one of the uniqueness in polymerization by slurry process. The inventors are using this process to produce HDPE polymer.

In the following, the invention will be described in greater detail by referring to specific examples in which embodiments in accordance with the invention are shown and compared with that of the prior art (comparative examples).

Definitions and Measurement Methods a) Density

Density is measured according to ISO 1183 and showed in g/cm$^3$ unit.

b) Melt Flow Index

The melt flow index (MI) is determined according to ISO1133 at 190° C. and is indicated in g/10 min. The load under the melt flow rate is determined and indicated as a subscript, for instance MI$_2$ is measured under 2.16 kg load, MI$_5$ is measured under 5 kg load.

c) Comonomer Content

Quantitative $^{13}$C-NMR was used to determine the comonomer content in polyethylene copolymer. The characteristic signals corresponding to the incorporation of Butene-1 and/or Hexene-1 were identified and calculated to obtain the amount of comonomer in the polymer.

d) Crystallinity

The crystallinity is frequently used for characterization by Differential Scanning Calorimetry (DSC) follow ASTM D 3418. Samples were identified by peak temperature and enthalpy, as well as the % crystallinity was calculated from the peak area.

e) Soluble Fraction

Temperature Rising Elution Fractionation (TREF) equipment with Infrared (IR) detector from Polymer Char S.A., Valencia, Spain was used to characterize the chemical composition distribution of polyethylene sample. Around 50 mg of the sample was dissolved in 20 ml of 1,2,4-Trichlorobenzene with 300 ppm butylated hydroxytoluene (BHT) at 150° C. for 60 min. The solution was injected into the TREF column and stabilized at 95° C. for 45 min. Then a cooling process started at constant rate of 0.5° C./min from 95 to 35° C. The column was held at 35° C. around 10 min, then the elution of the soluble fraction started with flow rate of 1 ml/min at this temperature for further 10 min. The soluble fraction data were collected and represented the low molecular weight amorphous fraction. Then the elution process to the crystalline polymer started with flow rate 1.0 ml/min from 35° C. to 120° C. with heating rate of 1.0° C./min. The TREF chromatogram was continuously generated during the elution process by IR detector.

f) Gel Permeation Chromatography (GPC)

Around 8 mg of sample was dissolved in 8 ml of 1,2,4-trichlorobenzene at 160° C. for 90 min. Then the sample solution, 200 μl, was injected into the high temperature GPC with IR5, an infared detector (Polymer Char, Spain) with flow rate of 0.5 ml/min at 145° C. in column zone and 160° C. in detector zone. The data was processed by GPC One® software, Polymer Char, Spain.

g) Molecular Weight and Molecular Weight Distribution (MWD)

The weight average molecular weight (Mw), the number average molecular weight (Mn) and the Z average molecular weight (Mz) in g/mol were analysed by gel permeation chromatography (GPC). Molecular weight distribution was calculated by Mw/Mn.

h) Eta747

The viscosity at shear stress 747 Pa was performed on DHR-3 controlled stress rotational rheometer from TA instrument. Using parallel plate geometry of 25 mm and measurement Gap 1.8 mm. The sample was melt in Compression molding at 190° C. for 5 minutes. The creep stress 747 Pa was applied to sample under nitrogen at 190° C. The strain deformation (γ) was monitored in the function of time. Eta747 was calculated from strain deformation at equilibrium creep time.

i) Charpy Impact Strength

Charpy impact strength is determined according to ISO179 at 23° C., 0° C. and −30° C. and showed in the unit kJ/m².

j) Accelerated Creep Test (ACT)

The test is performed by HESSEL Ingenicurtechnik GmbH following the PAS1075 standard and expressed the result time in hour (h).

k) Pressure Resistance

Pressure resistance was evaluated on 32 mm SDR 11 pipes produced by CINCINNATI extruders according to ISO 1167. The time to failure is determined in hours.

l) Estimated LPL

Lifetime of pipe at 50 years was estimated following ISO 9080 at temperature 20° C., 60° C. and 80° C. The lower prediction limit (LPL) of pipe observed the stress level at estimated 50 years.

EXAMPLES

In order to produce comparative (Comp.) and inventive (Inv.) bimodal PE resin, the polymerization process and procedure is typically the same as that of CX slurry process. Also, Ziegler-Natta catalyst is used. The comonomer type was applied by 1-hexene. However, the operating conditions have to optimize with polymer design.

The polymerization catalysts include coordination catalysts of a transition metal called Ziegler-Natta (ZN). A commercial available Ziegler-Natta catalyst was used. Bimodal polyethylene resins, hereinafter base resin, produced in accordance with two-stage cascade slurry polymerization process and having composition ratios of a) low molecular weight (LMW) HDPE having MI$_2$ in the range of 100 to 700 g/10 min, and density ≥0.970 g/cm³ and b) the bimodal high molecular weight (HMW) HDPE containing LMW from 1$^{st}$ reactor and having MFR$_5$ 0.20-0.340 g/10 min and density 0.945-0.965 g/cm³. The LMW HDPE resin is a homopolymer polymerized in the first reactor in the absence of comonomer. The HMW PE resin produced in the second reactor is copolymer containing 1-hexene content of 0.5-1.0% mol. The bimodal resin comprises 50 to 60% wt. of the first polyethylene homopolymer fraction and 40 to 50% wt. of a second polyethylene copolymer fraction.

The obtaining bimodal PE product from the second reactor was dried and the resulting powder sent to a finishing operation where it was compounded with carbon black 2-2.5 wt % in extruder at 210° C. under nitrogen atmosphere with 2000 ppm Ca/Zn stearate and 3000 ppm hindered phenol/phosphate stabilizers and, then, pelletized. Density and MI were obtained using the pelletized resins.

Plastic pipe is produced by extruding molten polymer through an annular die. The pipe is formed by passing the molten extrudate through a sizing sleeve and then to a cooling tank where water is sprayed on the outer surface. Solidification proceeds from the outer surface radially inward.

Polymerization conditions and polymer properties are shown in Table 1-2, respectively. Testing results and analysis were applied and recorded on the compound.

TABLE 1

Polymerization conditions of Comparative example and Inventive example.

| Property | Unit | Comp. 1 | Comp. 2 | Comp. 3 | Inv. 1 | Inv. 2 |
|---|---|---|---|---|---|---|
| Homopolymer | | | | | | |
| Split ratio | % | 53-55 | 53-55 | 58-60 | 54-56 | 51-53 |
| Temperature | ° C. | 81-85 | 81-85 | 81-85 | 81-85 | 81-85 |
| Pressure | Bar | 6.0-6.5 | 6.0-6.5 | 6.0-6.5 | 7.5-8.0 | 6.0-6.5 |
| Hexane flow rate | L/h | 75.79 | 75.79 | 77.79 | 44.8 | 49.38 |
| Ethylene flow rate | L/h | 1507.4 | 1507.4 | 1932.5 | 1243.7 | 1621.8 |
| Hydrogen flow rate | NL/h | 1276.24 | 1276.24 | 286.64 | 443 | 239.4 |
| Catalyst flow rate | g/h | 4.05 | 4.05 | 4.26 | 3.03 | 2.68 |
| Copolymer | | | | | | |
| Split ratio | % | 45-46 | 45-46 | 39-40 | 45-46 | 46-48 |
| Temperature | ° C. | 70-75 | 70-75 | 68-70 | 68-70 | 67-69 |
| Pressure | Bar | 1.5-3.0 | 1.5-3.0 | 1.5-3.0 | 1.5-3.0 | 1.5-3.0 |
| Hexane flow rate | L/h | 71.0 | 71.0 | 80.9 | 88.0 | 65.6 |
| Ethylene flow rate | L/h | 2178.2 | 2178.2 | 2282.6 | 2804.0 | 3597.0 |
| Hydrogen flow rate | NL/h | 148.87 | 148.87 | 115.01 | 1.77 | 1.57 |
| Comonomer | Kg/h | 0.991 | 0.991 | 1.25 | 1.15 | 2.15 |
| Comonomer type | — | Hx-1 | Hx-1 | Hx-1 | Hx-1 | Hx-1 |

All comparative and inventive examples were produced using different polymerization conditions. The low polymer content was adjusted by changing the conditions of centrifuge separation between polymer powder and diluent in slurry. Inventive example 1 and Inv. 2, show high pressure resistance at 20° C. in various hoop stress from 12.0 to 13.2 MPa. The SCG property shown by accelerated crack test (ACT) results of Comp. 1-3 and Inv. 1-2 is linearly inverse proportional to low polymer content indicated by soluble fraction from TREF measurement. From ACT results by Hessel, Germany are more than 1000 hours which accordance with correlation of Full Notched Creep Test (FNCT) for more than 8760 hours. In certain embodiment of invention, the obtainable invention meets the designation of PE112RC. All the results indicated the distinguish features and advantages of the inventive ethylene copolymer compositions over the prior art.

TABLE 2

Polymer properties of Example 1, Example 2 and Comparative examples.

| Property | Unit | Comp. 1 | Comp. 2 | Comp. 3 | Inv. 1 | Inv. 2 |
|---|---|---|---|---|---|---|
| Homopolymer | | | | | | |
| $MFR_2$ | g/10 min | 670 | 620 | 232 | 556 | 340 |
| Copolymer | | | | | | |
| Density | g/cm3 | 0.963 | 0.962 | 0.963 | 0.962 | 0.959 |
| $MFR_5$ | g/10 min | 0.24 | 0.27 | 0.22 | 0.2 | 0.21 |
| 1-Hexene Content | % mol | 0.71 | 0.7 | 0.62 | 0.78 | 0.77 |
| Crystallinity | % | 59.2 | 61.37 | 60.1 | 63 | 59.72 |
| Soluble fraction by TREF | % wt | 10.3 | 10 | 9.1 | 5.5 | 3.5 |
| Mw | g/mol | 231043 | 225450 | 233430 | 263166 | 267811 |
| Mn | g/mol | 6860 | 6937 | 7991 | 8679 | 10136 |
| Mz | g/mol | 1363644 | 1294832 | 1612888 | 1910970 | 186469 |
| MWD | — | 33.7 | 32.5 | 29.2 | 30.3 | 26.4 |
| Eta747 | Pa · s | 723 | 716 | 1211 | 1017 | 842 |
| Charpy impact (23° C.) | $kJ/m^2$ | 21.73 | 23.453 | 22.9 | 30.77 | 33.69 |
| Charpy impact (0° C.) | $kJ/m^2$ | 15.586 | 17.817 | 13.9 | 22.47 | 25.46 |
| Charpy impact (−30° C.) | $kJ/m^2$ | 8.104 | 7.617 | 6.5 | 10.9 | 11.37 |
| ACT | h | 84.6 | 102.2 | 335.6 | 1001 | 1160 |
| Pressure resistance at 20° C. | | | | | | |
| 13.0 MPa | h | 58 | NA | 87 | 627 | NA |
| 12.8 MPa | h | 89 | NA | 155 | 766 | NA |
| 12.6 MPa | h | 152 | NA | 260 | 1273 | NA |
| 12.4 MPa | h | 203 | NA | 264 | 2522 | NA |
| 12.0 MPa | h | 548 | NA | 728 | >4200 | NA |
| Estimated LPL at 50 years | MPa | NA | NA | NA | >11.2 | NA |

The features disclosed in the foregoing description and in the claims may, both separately and in any combination, be material for realizing the invention in diverse forms thereof.

The invention claimed is:

1. A bimodal polyethylene composition comprising a low molecular weight polyethylene homopolymer fraction and high molecular weight polyethylene copolymer fraction having a $C_4$ to $C_{10}$ α-olefin comonomer content of 0.25 to 3% mol with respect to the total monomer comprised in the high molecular weight polyethylene comonomer fraction, wherein
the content of the low molecular weight polyethylene is from 50 to 60% wt with respect to the total weight of the bimodal polyethylene composition; and
the bimodal polyethylene composition has a soluble fraction according to Temperature Rising Elution Fractionation in 1,2,4-trichlorobenzene with 300 ppm of butylated hydroxytoluene at 150° C. of less than 6% wt.

2. The bimodal polyethylene composition according to claim 1, wherein the bimodal polyethylene composition has a density from 0.945 to 0.965 g/cm³ and a $MI_5$ of 0.10 to 0.50 g/10 min.

3. The bimodal polyethylene composition according to claim 1, wherein the bimodal polyethylene composition comprises 50 to 60% wt with respect to the total weight of the bimodal polyethylene composition of the low molecular weight polyethylene homopolymer fraction and 40 to 50% wt with respect to the total weight of the bimodal polyethylene composition of the high molecular weight polyethylene copolymer fraction.

4. The bimodal polyethylene composition according to claim 1, wherein the bimodal polyethylene composition has the soluble fraction according to Temperature Rising Elution Fractionation in 1,2,4-trichlorobenzene with 300 ppm of butylated hydroxytoluene at 150° C. of 2 to 5.9% wt.

5. The bimodal polyethylene composition according to claim 1, wherein the bimodal polyethylene composition has the soluble fraction according to Temperature Rising Elution Fractionation in 1,2,4-trichlorobenzene with 300 ppm of butylated hydroxytoluene at 150° C. of 3 to 5.9% wt.

6. The bimodal polyethylene composition according to claim 1, wherein the high molecular weight polyethylene copolymer fraction has a $C_4$ to $C_{10}$ α-olefin comonomer content of 0.25 to 2% mol with respect to the total monomer comprised in the high molecular weight polyethylene comonomer fraction.

7. The bimodal polyethylene composition according to claim 1, wherein the high molecular weight polyethylene copolymer fraction has a $C_4$ to $C_{10}$ α-olefin comonomer content of 0.5 to 1% mol with respect to the total monomer comprised in the high molecular weight polyethylene comonomer fraction.

8. The bimodal polyethylene composition according to claim 1, wherein the low molecular weight polyethylene is from 50 to 55% wt with respect to the total weight of the bimodal polyethylene composition.

9. The bimodal polyethylene composition according to claim 1, wherein the high molecular weight polyethylene is from 45 to 50% wt with respect to the total weight of the bimodal polyethylene composition.

10. The bimodal polyethylene composition according to claim 1, wherein the $C_4$ to $C_{10}$ α-olefin comonomer is selected from the group consisting of 1-butene, 1-hexene, 1-octene, 1-decene and mixtures thereof.

11. Pipe comprising the bimodal polyethylene composition according to claim 1.

12. The bimodal polyethylene composition of claim 2, having a density from 0.952 to 0.965 g/cm$^3$.

13. The bimodal polyethylene composition of claim 12, having a density from 0.955 to 0.963 g/cm$^3$.

14. The bimodal polyethylene composition of claim 2, having a MI$_5$ from 0.15 to 0.35 g/cm$^3$.

15. The bimodal polyethylene composition of claim 14, having a MI$_5$ from 0.18 to 0.28 g/cm$^3$.

16. The bimodal polyethylene composition of claim 10, wherein the $C_4$ to $C_{10}$ α-olefin comonomer is 1-hexene.

* * * * *